United States Patent

Wysocki

[11] Patent Number: 6,076,924
[45] Date of Patent: Jun. 20, 2000

[54] OPTICAL DEVICE WITH REARVIEW CAPABILITIES

[76] Inventor: John Wysocki, 9001 S. Cicero #105, Oak Lawn, Ill. 60453

[21] Appl. No.: 09/461,661

[22] Filed: Dec. 14, 1999

Related U.S. Application Data

[60] Provisional application No. 60/113,384, Dec. 23, 1998.
[51] Int. Cl.[7] ........................................ G02C 7/14
[52] U.S. Cl. ................................. 351/50; 381/41
[58] Field of Search .................................. 351/50, 45, 46, 351/44, 41, 158

[56] References Cited

U.S. PATENT DOCUMENTS 4,919,529  4/1990  Hyun ......................................... 351/50
5,416,536  5/1995  Tec, Jr. ..................................... 351/50

*Primary Examiner*—Hung Xuan Dang
*Attorney, Agent, or Firm*—Goldstein & Canino

[57] ABSTRACT

An optical device with rearview capabilities including a pair of generally half-moon shaped attachment members that are adapted for removably securing to an interior surface of the pair of lenses of the eyeglasses. Each of the attachment members have a first surface and a second surface. The first surface has a reflective material disposed thereon. The second surface has a layer of adhesive disposed thereon to facilitate securement of the attachment members to the lenses. The layer of adhesive has a layer of protective film disposed thereon prior to use.

2 Claims, 2 Drawing Sheets

OPTICAL DEVICE WITH REARVIEW CAPABILITIES

CROSS REFERENCES AND RELATED SUBJECT MATTER

This application relates to subject matter contained in provisional patent application Ser. No. 60/113,384, filed in the United States Patent & Trademark Office on Dec. 23, 1998.

BACKGROUND OF THE INVENTION

The present invention relates to an optical device with rearview capabilities and more particularly pertains to mounting on eyeglasses to provide rearview vision.

Eyeglasses increase a person's ability to see. However, even though the eyeglasses aid the ability to see in front of a person, they do not solve the problem of being able to see what is behind them. Many people who are involved in activities often wish to see what is behind them and cannot afford to look back. This is especially true for bicyclist's, who cannot risk turning around to see behind them for fear that they might lose control of their bicycle and crash. The present invention seeks to remedy this problem.

The use of optical devices is known in the prior art. More specifically, optical devices heretofore devised and utilized for the purpose of enhancing vision are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,416,536 to Tee, Jr. discloses an eyeglass lens with a rear view reflective mirror surface. U.S. Pat. No. 4,603,944 to Greenlaw, U.S. Pat. No. 5,005,964 to Berke, and U.S. Pat. No. 5,048,943 to Allen disclose various mirror attachments for eyeglasses to allow the wearer to see behind himself. U.S. Pat. No. Des. 327,079 to Allen discloses an ornamental design for eyeglasses with rear view mirror attachment.

While these devices fulfill their respective, particular objective and requirements, the aforementioned patents do not describe an optical device with rearview capabilities for mounting on eyeglasses to provide rearview vision.

In this respect, the optical device with rearview capabilities according to the present invention substantially departs from the conventional concepts and designs of the prior art, and in doing so provides an apparatus primarily developed for the purpose of mounting on eyeglasses to provide rearview vision.

Therefore, it can be appreciated that there exists a continuing need for new and improved optical device with rearview capabilities which can be used for mounting on eyeglasses to provide rearview vision. In this regard, the present invention substantially fulfills this need.

SUMMARY OF THE INVENTION

In the view of the foregoing disadvantages inherent in the known types of optical devices now present in the prior art, the present invention provides an improved optical device with rearview capabilities. As such, the general purpose of the present invention, which will be described subsequently in greater detail, is to provide a new and improved optical device with rearview capabilities and method which has all the advantages of the prior art and none of the disadvantages.

To attain this, the present invention essentially comprises a pair of eyeglasses defined by a frame member. The frame member has a pair of lenses disposed thereon for covering a pair of eyes of a wearer. The frame member has a pair of ear pieces extending rearwardly therefrom for engaging ears of the wearer. A pair of generally half-moon shaped attachment members are provided that are adapted for removably securing to an interior surface of the pair of lenses of the eyeglasses. Each of the attachment members have a first surface and a second surface. The first surface has a reflective material disposed thereon. The second surface has a layer of adhesive disposed thereon to facilitate securement of the attachment members to the lenses. The layer of adhesive has a layer of protective film disposed thereon prior to use.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved optical device with rearview capabilities which has all the advantages of the prior art optical devices and none of the disadvantages.

It is another object of the present invention to provide a new and improved optical device with rearview capabilities which may be easily and efficiently manufactured and marketed.

It is a further object of the present invention to provide a new and improved optical device with rearview capabilities which is of durable and reliable construction.

An even further object of the present invention is to provide a new and improved optical device with rearview capabilities which is susceptible of a low cost of manufacture with regard to both materials and labor, and which accordingly is then susceptible of low prices of sale to the consuming public, thereby making such an optical device with rearview capabilities economically available to the buying public.

Even still another object of the present invention is to provide a new and improved optical device with rearview capabilities for mounting on eyeglasses to provide rearview vision.

Lastly, it is an object of the present invention to provide a new and improved optical device with rearview capabilities including a pair of generally half-moon shaped attachment members that are adapted for removably securing to an interior surface of the pair of lenses of the eyeglasses. Each of the attachment members have a first surface and a second surface. The first surface has a reflective material disposed thereon. The second surface has a layer of adhesive disposed thereon to facilitate securement of the attachment members to the lenses. The layer of adhesive has a layer of protective film disposed thereon prior to use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
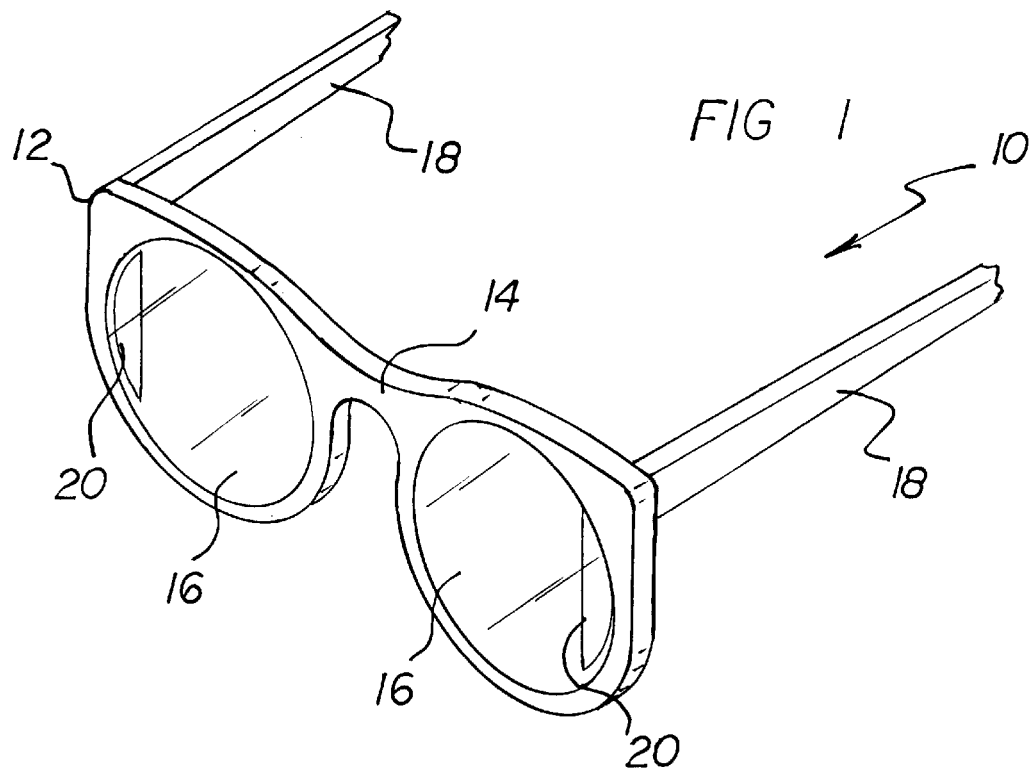
FIG. 1 is a perspective view of the preferred embodiment of the optical device with rearview capabilities constructed in accordance with the principles of the present invention.
Figure 2:
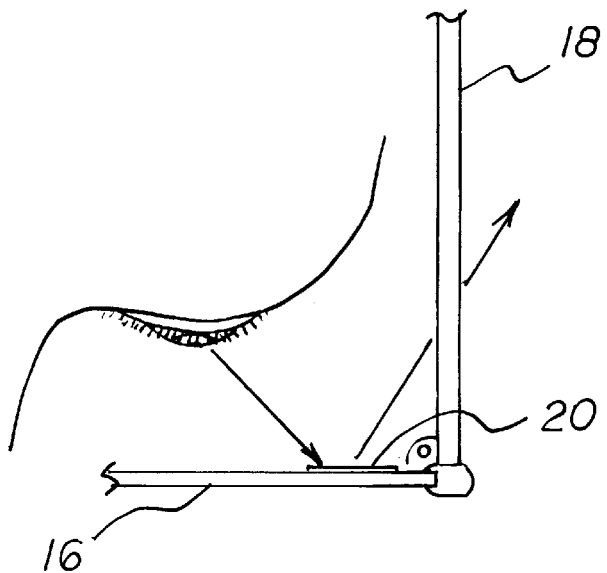
FIG. 2 is a top plan view of the present invention illustrated in use.
Figure 3:
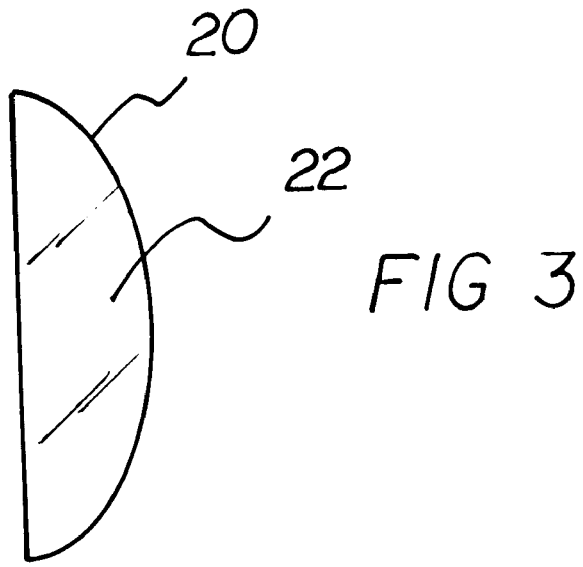
FIG. 3 is an isolated front view of the mirrored front surface of the attachment.
Figure 4:
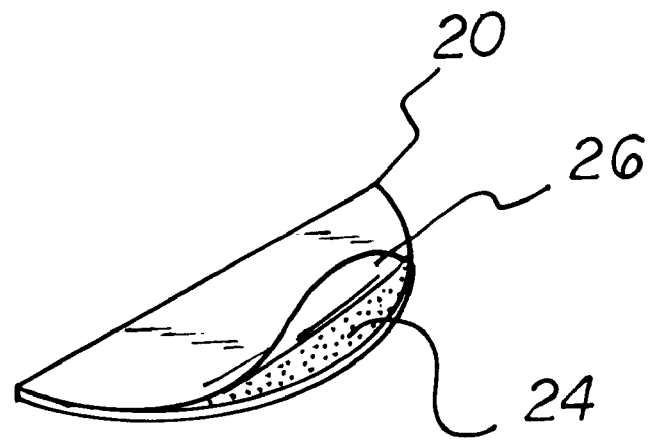
FIG. 4 is a rear perspective view of the attachment illustrating the adhesive layer disposed thereon.

With reference now to the drawings, and in particular, to FIGS. 1 through 4 thereof, the preferred embodiment of the new and improved optical device with rearview capabilities embodying the principles and concepts of the present invention and generally designated by the reference number 10 will be described.

Specifically, it will be noted in the various Figures that the device relates to a optical device with rearview capabilities for mounting on eyeglasses to provide rearview vision. In its broadest context, the device consists of a pair of eyeglasses and a pair of half-moon shaped attachment members. Such components are individually configured and correlated with respect to each other so as to attain the desired objective.

The pair of eyeglasses 12 are defined by a frame member 14. The frame member 14 has a pair of lenses 16 disposed thereon for covering a pair of eyes of a wearer. The frame member 14 has a pair of ear pieces 18 extending rearwardly therefrom for engaging ears of the wearer.

The pair of generally half-moon shaped attachment members 20 are adapted for removably securing to an interior surface of the pair of lenses 16 of the eyeglasses 12. Each of the attachment members 20 have a first surface and a second surface. The first surface has a reflective material 22 disposed thereon. The second surface has a layer of adhesive 24 disposed thereon to facilitate securement of the attachment members 20 to the lenses 16. The layer of adhesive 24 has a layer of protective film 26 disposed thereon prior to use. In use, the attachment members 20 preferably occupy less than twenty percent of the surface of the lenses 16 thereby not limiting the ability of the wearer to see in front of them. The layer of adhesive 24 used should be light enough to allow for the easy removal of the attachment members 20 if the wearer so desires.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An optical device with rearview capabilities for mounting on eyeglasses to provide rearview vision comprising, in combination:

a pair of eyeglasses defined by a frame member, the frame member having a pair of lenses disposed thereon for covering a pair of eyes of a wearer, the frame member having a pair of ear pieces extending rearwardly therefrom for engaging ears of the wearer;

a pair of generally half-moon shaped attachment members adapted for removably securing to an interior surface of the pair of lenses of the eyeglasses, each of the attachment members having a first surface and a second surface, the first surface having a reflective material disposed thereon, the second surface having a layer of adhesive disposed thereon to facilitate securement of the attachment members to the lenses, the layer of adhesive having a layer of protective film disposed thereon prior to use.

2. An optical device with rearview capabilities for mounting on eyeglasses to provide rearview vision comprising, in combination:

a pair of generally half-moon shaped attachment members adapted for removably securing to an interior surface of a pair of lenses of a pair of eyeglasses, each of the attachment members having a first surface and a second surface, the first surface having a reflective material disposed thereon, the second surface having a layer of adhesive disposed thereon to facilitate securement of the attachment members to the lenses, the layer of adhesive having a layer of protective film disposed thereon prior to use.

* * * * *